United States Patent
Wright et al.

(10) Patent No.: US 6,936,161 B2
(45) Date of Patent: Aug. 30, 2005

(54) FLUID FILTER APPARATUS

(75) Inventors: Allen B. Wright, Hope Mills, NC (US); Timothy Alan Byrd, Fayetteville, NC (US); L. Steven Cline, Fayetteville, NC (US)

(73) Assignee: Arvin Technologies, Inc., Troy, MI (US)

( * ) Notice: Subject to any disclaimer, the term of this patent is extended or adjusted under 35 U.S.C. 154(b) by 340 days.

(21) Appl. No.: 10/224,678

(22) Filed: Aug. 21, 2002

(65) Prior Publication Data

US 2004/0035766 A1 Feb. 26, 2004

(51) Int. Cl.⁷ .................. B01D 35/147; B01D 35/157
(52) U.S. Cl. ............... 210/97; 210/109; 210/110; 210/130; 210/433.1; 210/443; 210/445; 55/313; 96/400
(58) Field of Search .................. 210/97, 109, 110, 210/130, 168, 171, 172, 416.5, 418, 435, 443, 445, 453, 454, 456, 459, 493.1–493.2, 497.01, 416.1; 55/312, 313; 96/399, 400

(56) References Cited

U.S. PATENT DOCUMENTS

| 4,271,020 | A |   | 6/1981  | Van Meter ............... 210/133 |
|-----------|---|---|---------|----------------------------------|
| 4,532,958 | A |   | 8/1985  | Napolitano ............. 137/454.2 |
| 5,098,559 | A | * | 3/1992  | Mack et al. .............. 210/130 |
| 5,589,060 | A |   | 12/1996 | Gebert et al. ............ 210/130 |
| 5,814,215 | A |   | 9/1998  | Bruss et al. ............. 210/130 |
| 6,117,312 | A | * | 9/2000  | Mees et al. .............. 210/130 |
| 6,722,507 | B2 | * | 4/2004 | Cline ...................... 210/418 |

FOREIGN PATENT DOCUMENTS

| DE | 43 31 598 A1 | 3/1995 |
| GB | 2 162 079 A | 1/1986 |
| JP | 2001149731 | 6/2001 |
| WO | WO 01/12294 A1 | 2/2001 |

* cited by examiner

*Primary Examiner*—Joseph Drodge
(74) *Attorney, Agent, or Firm*—Barnes & Thornburg LLP

(57) ABSTRACT

A fluid filter apparatus includes a filter element located in a filter chamber formed in a filter housing. A valve unit is located in a passageway formed in the filter housing to control flow of fluid into or out of the filter chamber.

20 Claims, 7 Drawing Sheets

US 6,936,161 B2

FLUID FILTER APPARATUS

BACKGROUND

The present disclosure relates to a filter apparatus, and particularly to a filter apparatus for filtering fluids for an engine. More particularly, the present disclosure relates to a fluid filter apparatus for filtering engine oil.

Fluid filters are used onboard vehicles and in other apparatus containing transport systems to remove unwanted solids or other contaminants from fluids such as oil. Oil filters are provided to clean oil used in vehicle engines.

SUMMARY

According to the present disclosure, a fluid filter apparatus includes a filter element located in a filter chamber of a filter housing. The fluid filter apparatus further includes a valve unit located in a passageway formed in the filter housing to control flow of fluid into and out of the filter chamber through the passageway.

The valve unit includes a fluid flow controller and a container for retaining the fluid flow controller in the passageway. The container is formed to include an interior region containing the fluid flow controller which includes a flow-control valve and spring arranged to move the flow-control valve relative to the container.

In illustrative embodiments, the filter housing is formed to include an inlet passageway, a first outlet passageway, and a second outlet passageway. The inlet passageway is arranged to conduct fluid into the filter chamber. The first outlet passageway is arranged to conduct fluid out of the filter chamber. The second outlet passageway is arranged to conduct fluid from the filter chamber to a suitable downstream location in the first outlet passageway to allow fluid to bypass the filter element when, for example, the filter element is clogged by contaminant material.

A separate valve unit is located in each of the three passageways formed in the filter housing in one illustrative embodiment of the disclosure. The valve unit in the inlet passageway controls flow of fluid through the inlet passageway and into the filter chamber. The valve unit in the first outlet passageway controls flow of filtered fluid out of the filter chamber through the first outlet passageway. The valve unit in the second outlet passageway controls when fluid can bypass the filter element to exit the filter chamber through the second outlet passageway.

Additional features of the disclosure will become apparent to those skilled in the art upon consideration of the following detailed description of illustrative embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
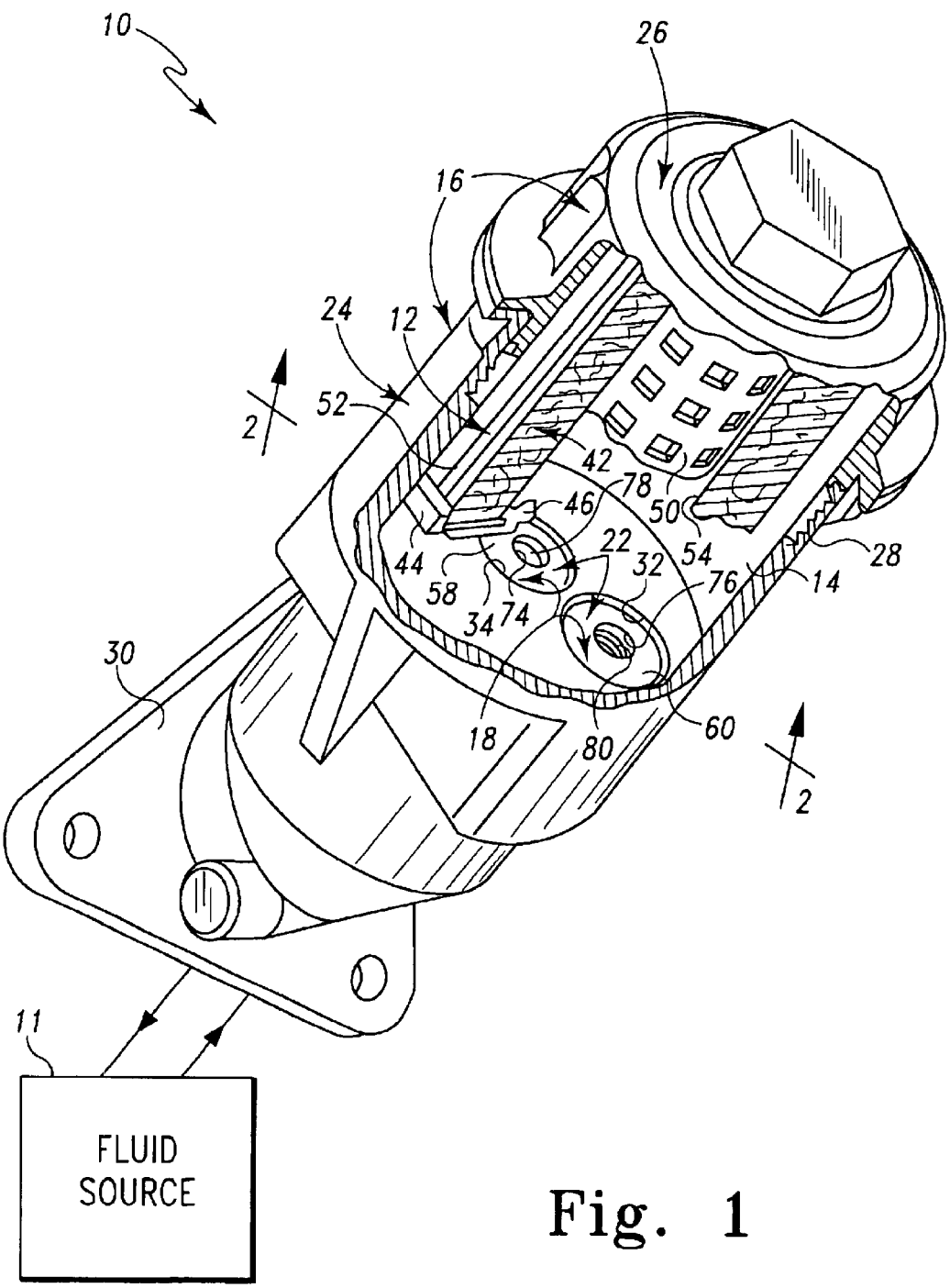
FIG. 1 is a perspective view of a fluid filter apparatus, with portions broken away, to show two of three valve units arranged to lie below a filter element positioned in a filter chamber formed in a filter housing and configured to control flow of fluid into and out of the filter chamber.
Figure 2:
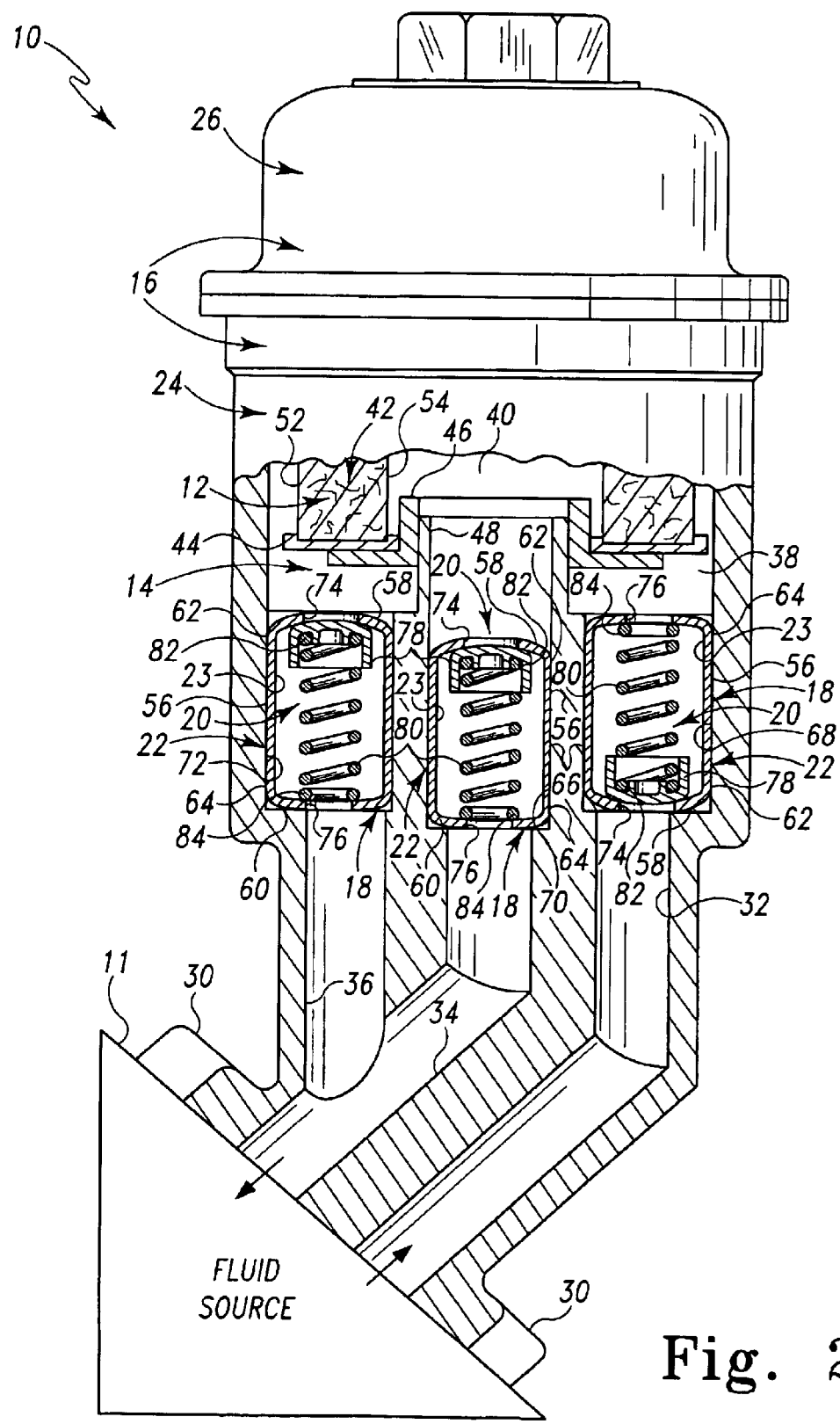
FIG. 2 is a sectional view taken along line 2—2 of FIG. 1 showing each of the three valve units located in one of the passageways formed in the filter housing, the "right-side" valve unit controlling flow of fluid into the filter chamber, the "middle" valve unit controlling flow of filtered fluid from the filter chamber, and the "left-side" valve unit controlling flow of fluid from the filter chamber when, for example, the fluid pressure in the filter chamber increases to reach a predetermined level, and showing that each valve unit includes a container containing a flow-control valve and a spring to retain the flow-control valve and the spring in the companion passageway.

A fluid filter apparatus 10 is arranged to filter contaminants from fluid, such as oil, received from a fluid source 11, such as a vehicle engine, as shown in FIGS. 1 and 2. Apparatus 10 includes a filter element 12 positioned in a filter chamber 14 formed in a filter housing 16 to filter the contaminants for return of filtered fluid to source 11.

Apparatus 10 includes one or more valve units 18 to control flow of fluid within apparatus 10, as shown in FIGS. 1 and 2. Unit 18 includes a normally closed fluid flow controller 20 (see FIG. 2) and a container 22 (see FIGS. 1 and 2) formed to include an interior region 23 (see FIG. 2) containing controller 20. Container 22 provides retainer means for retaining its associated controller 20 in a passageway formed in housing 16, as discussed in more detail below.

In the illustrated embodiments, apparatus 10 includes three such valve units 18 (see FIG. 2) which are positioned in three separate passageways to control fluid flow through apparatus 10. Fluid flow controllers 20 are normally closed to block flow of fluid from filter chamber 14 when fluid source 11 is not in use so that, the next time that fluid source 11 is operated, apparatus 10 has a supply of fluid to provide fluid source 11 quickly. This is particularly useful when apparatus 10 is an oil filter apparatus and fluid source 11 is a vehicle engine to minimize the time it takes to provide filtered oil to the vehicle engine when the vehicle engine is started up.

Housing 16 includes a base 24 and a cover 26, as shown in FIGS. 1 and 2. Base 24 and cover 26 are coupled together at a threaded interface 28 (see FIG. 1) and cooperate to provide filter chamber 14. Base 24 includes a mounting flange 30 for attachment to fluid source 11 (or other suitable foundation) by fasteners (not shown).

Base 24 is formed to include an inlet passageway 32 as shown in FIGS. 1 and 2. Inlet passageway 32 is arranged to conduct fluid from fluid source 11 to an unfiltered-fluid region 38 (see FIG. 2) of filter chamber 14.

A central portion of base 24 is formed to include a first outlet passageway 34 as shown in FIGS. 1 and 2. First outlet passageway 34 is arranged to conduct fluid from a filtered-fluid region 40 (see FIG. 2) of filter chamber 14 to fluid source 11

Base 24 is further formed to include a second outlet passageway 36 as shown in FIG. 2. Second outlet passageway 36 is arranged to conduct fluid from unfiltered-fluid region 38 to a "downstream point" in first outlet passageway 34 (below valve unit 18 in first outlet passageway 34) to bypass filter element 12 when the pressure of fluid in unfiltered-fluid region 38 reaches a predetermined level due to, for example, clogging of filter element 12 or thickening of the fluid during, for example, cold weather.

A valve unit 18 is positioned in each passageway 32, 34, 36, as shown in FIGS. 1 and 2. The valve unit 18 positioned in inlet passageway 32 is arranged to admit fluid from inlet passageway 32 into unfiltered-fluid region 38 of filter chamber 14. The valve unit 18 positioned in first outlet passageway 34 is arranged to admit fluid from filtered-fluid region 40 to first outlet passageway 34. The valve unit 18 positioned in second outlet passageway 36 is arranged to admit fluid from unfiltered-fluid region 38 to second outlet passageway 36.

Filter element 12 includes annular filter media 42 (see FIGS. 1 and 2) for filtering contaminants entrained in fluid flowing radially inwardly from unfiltered-fluid region 38 through media 42 to filtered-fluid region 40. Filter media 42 includes an exterior portion 52 and an interior portion 54. Exterior portion 52 is arranged to contact fluid as fluid flows from unfiltered-fluid region 38 into filter media 42. Interior portion 54 defines filtered-fluid region 40.

Filter element 12 further includes annular end caps 44 (one shown in FIGS. 1 and 2) coupled to ends of filter media 42. An annular seal 46 is attached to one end cap 44 as shown in FIGS. 1 and 2 for sealingly engaging a centrally located post 48 of base 24 to block fluid from flowing from unfiltered-fluid region 38 to filtered-fluid region 40 between post 48 and the associated end cap 44. A center tube 50 extends into filtered-fluid region 40 for radially positioning filter media 42 relative to housing 16 as shown in FIG. 1.

Each container 22 includes a cylindrical sleeve 56, a first end wall 58, and a second end wall 60 as shown in FIGS. 2–6. Sleeve 56 and walls 58, 60 cooperate to form interior region 23. Sleeve 56 includes a first end 62 formed to include an opening and a second end 64 formed to include an opening. First end wall 58 is coupled to first end 62 to close the opening formed therein and is formed to include an inlet 74 arranged to admit fluid into interior region 23. Second end wall 60 is coupled to second end 64 to close the opening formed therein and is formed to include an outlet 76 arranged to discharge fluid from interior region 23.

Each sleeve 56 includes a cylindrical exterior wall 66 that mates with a corresponding interior wall of base 24 to establish an interference fit therebetween, as shown in FIG. 2. Base 24 includes a first interior wall 68 that defines inlet passageway 32, a second interior wall 70 that defines first outlet passageway 34, and a third interior wall 72 that defines second outlet passageway 36. Exterior wall 66 of sleeve 56 located in inlet passageway 32 mates with first interior wall 68 to establish an interference fit therebetween. Exterior wall 66 of sleeve 56 located in first outlet passageway 34 mates with second interior wall 70 to establish an interference fit therebetween. Exterior wall 66 of sleeve 56 located in second outlet passageway 36 mates with third interior wall 72 to establish an interference fit therebetween.

Figure 5:
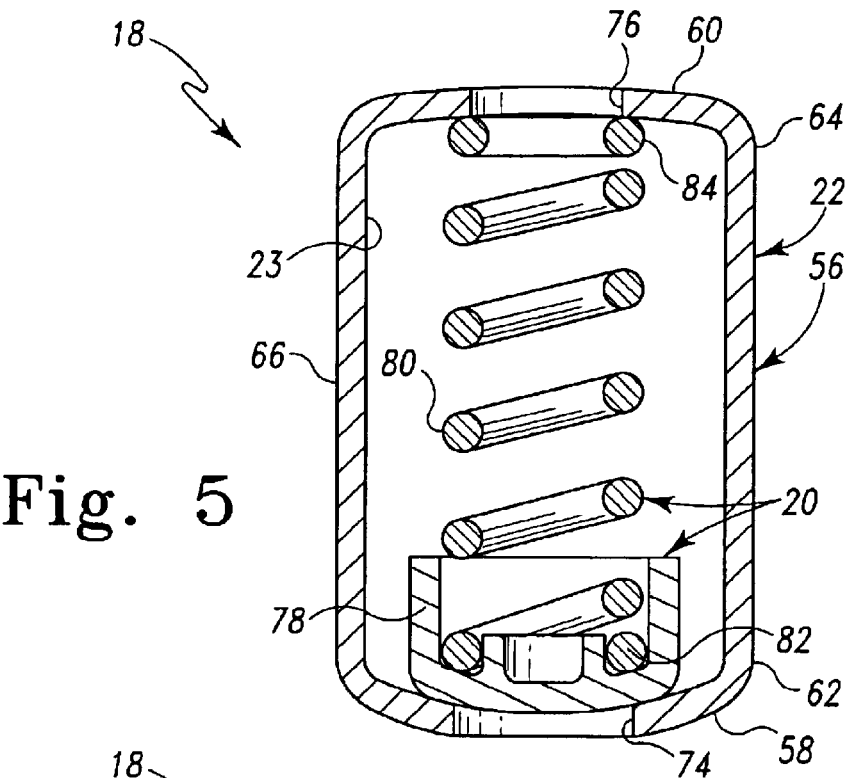
FIG. 5 is a sectional view of the valve unit of FIG. 4 taken along line 5—5 of FIG. 4 showing the spring biasing the valve to a normally closed position.
Figure 6:
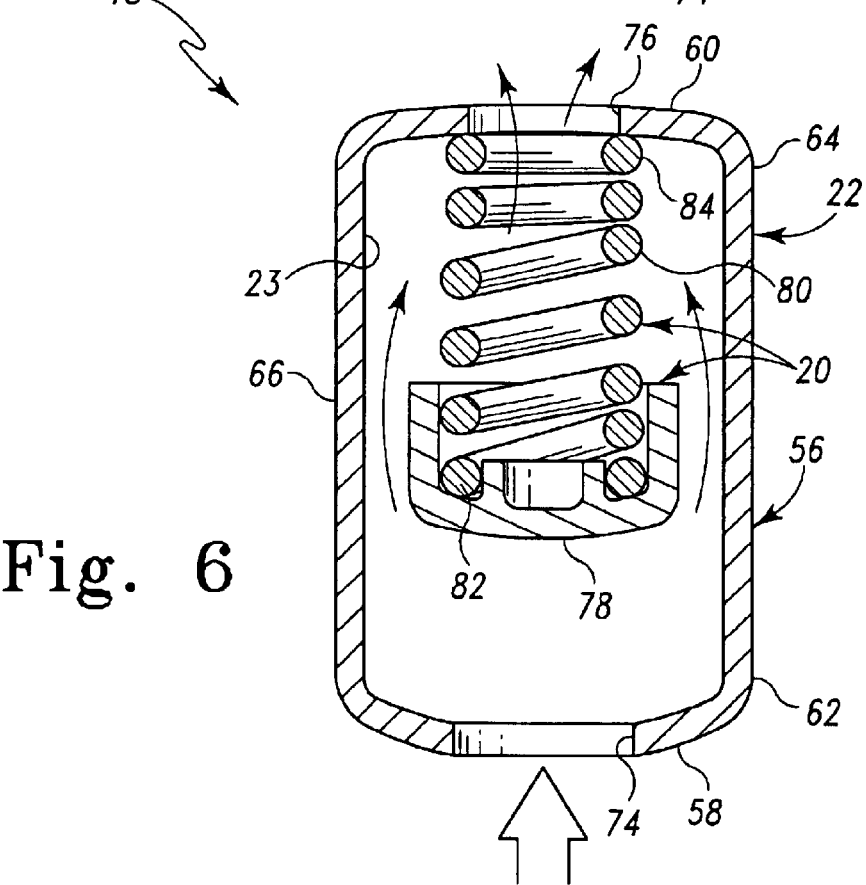
FIG. 6 is a sectional view similar to FIG. 5 showing the valve moved against the spring to an opened position in response to flow of fluid in an upward direction into and through the valve unit.

Each fluid flow controller 20 includes a valve 78 and a spring 80, as shown in FIGS. 2, 3, 5, and 6, located in the interior region 23 of the container 22 associated with the controller 20. Each spring 80 biases its companion valve 78 against a companion first end wall 58 to close a companion inlet 74 normally, as shown in FIGS. 2 and 5. Each spring 80 includes a first end 82 that engages a companion valve 78 and a second end 84 that engages a companion second end wall 60. Flow of fluid through a unit 18 causes the valve 78 to move away from the first end wall 58 to an opened position such that fluid flows through the inlet 74, around the valve 78 and between the convolutions of the spring 80 in the interior region 23, and through the outlet 76, as shown in FIG. 6.

Figure 3:
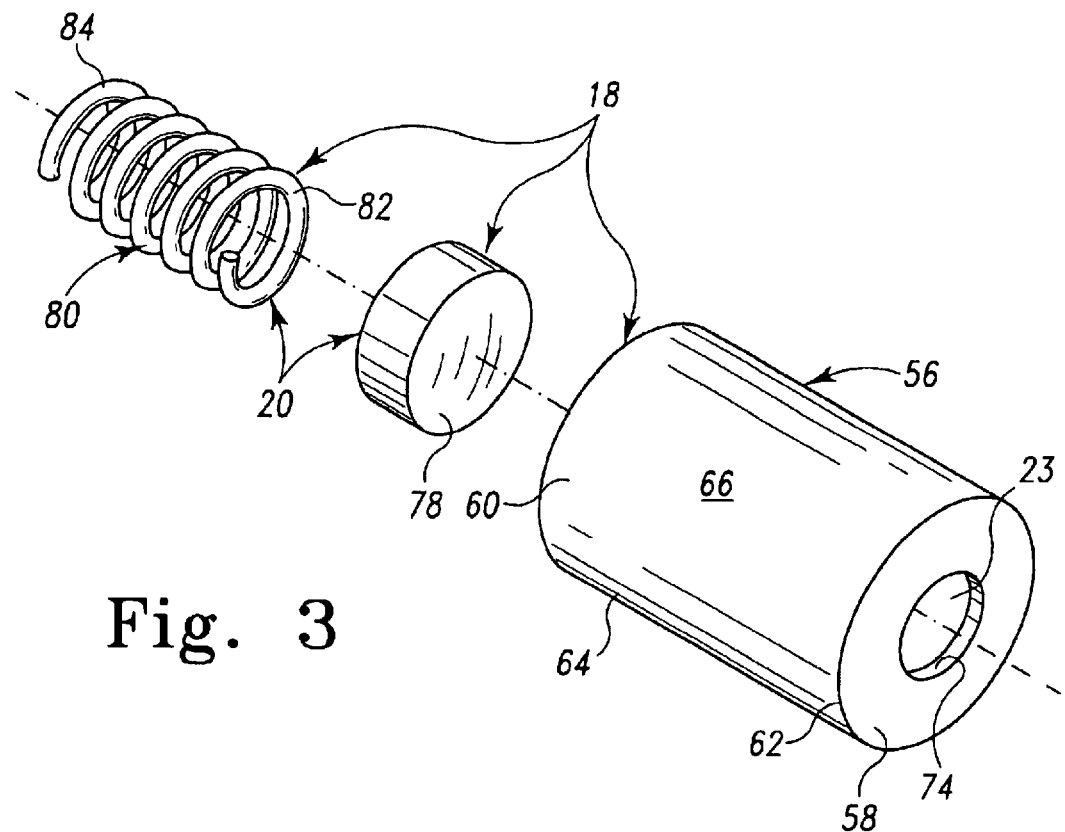
FIG. 3 is an enlarged, exploded, perspective view of various components included in one of the valve units of FIG. 2 before assembly of the components to form the valve unit.
Figure 4:
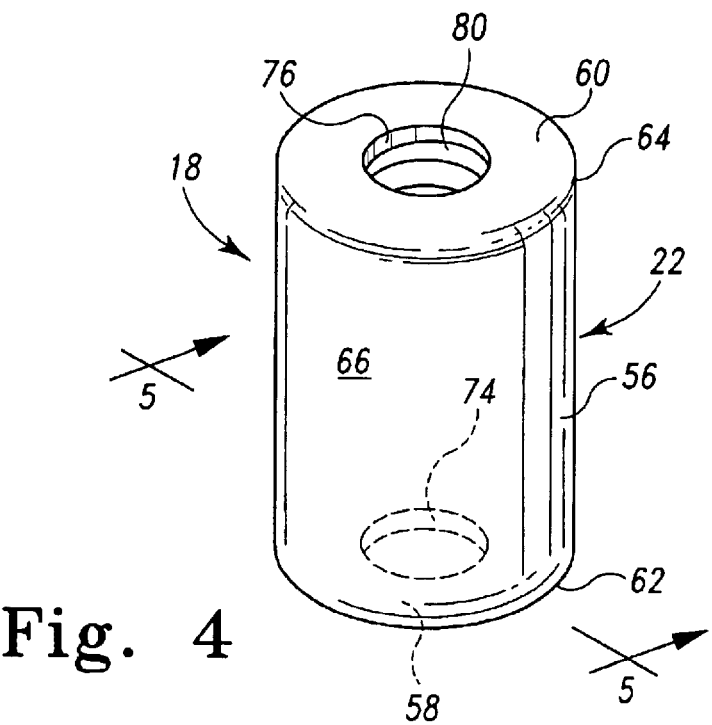
FIG. 4 is a perspective view of components of the valve unit of FIG. 3 after assembly of the components to form the valve unit.

Each valve unit 18 is assembled before it is inserted into one of passageways 32, 34, 36. During assembly of valve unit 18, container 22 is initially configured so that sleeve 56 and second end wall 60 cooperate to form a cylindrical sleeve, that is, second end wall 60 extends longitudinally, rather than radially, from sleeve 56, as shown in FIG. 3. In this orientation, second end wall 60 defines an opening having a diameter equal to the diameter of sleeve 56 to receive valve 78 and spring 80 therethrough into interior region 23. After valve 78 and spring 80 are inserted into interior region 23, second end wall 60 is crimped or otherwise deformed radially inwardly to trap valve 78 and spring 80 in interior region 23 and form outlet 76.

Once assembled, each valve unit 18 is inserted into one of the passageways 32, 34, 36 and retained therein by an interference fit between the container exterior wall 66 and the interior wall 68, 70, 72 without damaging walls 68, 70, 72. If necessary, each valve unit 18 can be removed from its passageway 32, 34, 36, again without damaging walls 68, 70, 72. Since walls 68, 70, 72 are not damaged during insertion, retention, and removal of control units 18, penalties associated with having to re-machine passageways 32, 34, 36 during replacement of fluid flow controllers 20 are avoided.

Figure 7:
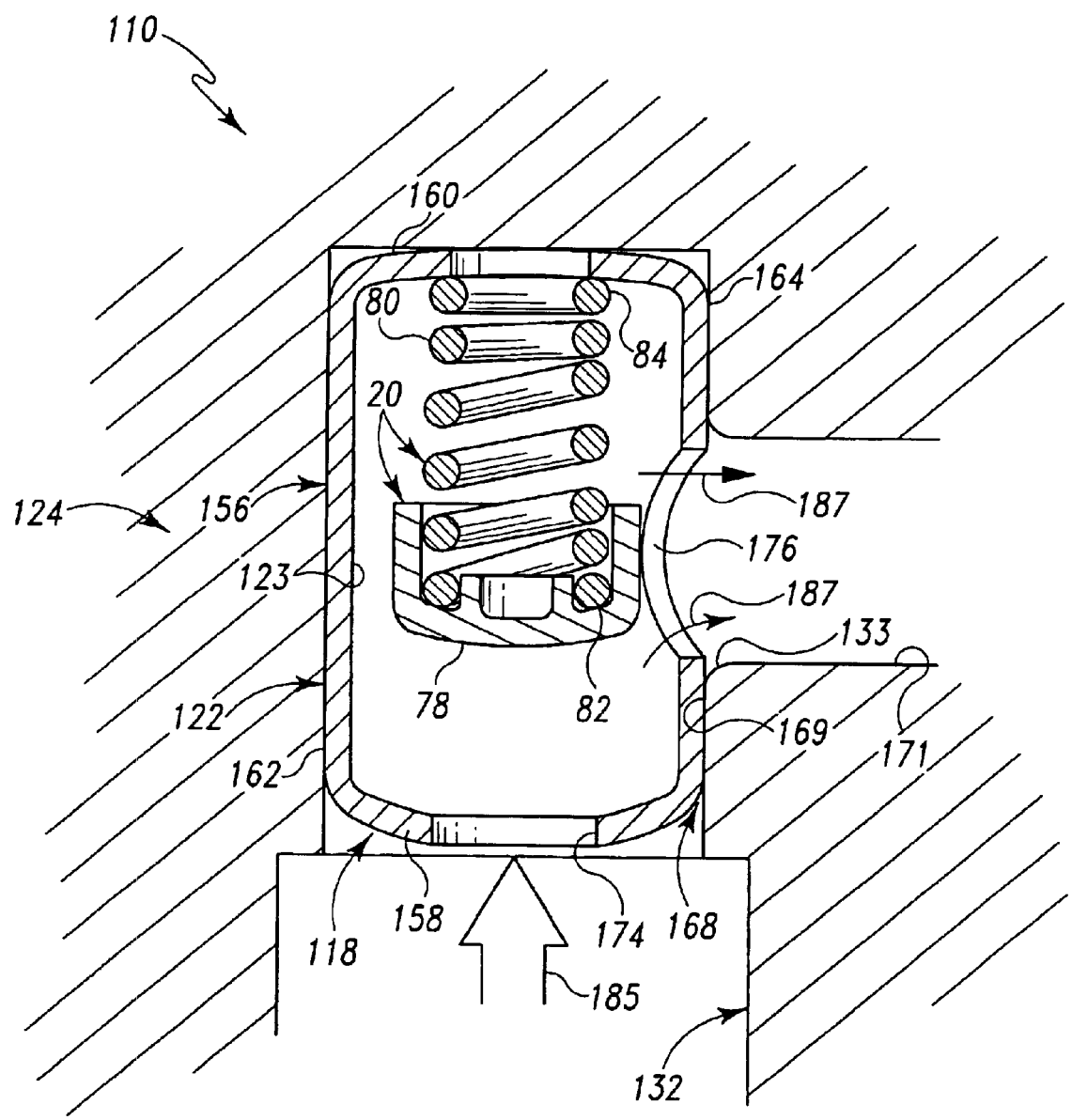
FIG. 7 is a sectional view of another valve unit located in a "turn" in a passageway formed in a filter housing.

Another valve unit 118 is shown in FIG. 7. Valve unit 118 is arranged for use with a filter housing base 124 of an apparatus 110 which is similar to apparatus 10, except as otherwise noted. Base 124 includes an interior wall 168 formed to include a passageway 132 arranged to conduct fluid. Wall 168 includes an upstream channel 169 and a downstream channel 171 extending from upstream channel 169 at an angle to upstream channel 169 to provide a turn 133 in passageway 132. Valve unit 118 is located in turn 133. In particular, unit 118 is located within upstream channel 169.

Valve unit 118 includes a fluid flow controller 20 and a container 122 formed to include an interior region 123 containing valve 78 and spring 80 of controller 20. Container 122 includes a cylindrical sleeve 156, a first end wall 158, and a second end wall 160. Sleeve 156 includes a first end 162 and a second end 164. First end wall 158 extends radially inwardly from first end 162 at an angle to sleeve 156 to close an opening provided by first end 162. First end wall 158 is formed to include an inlet 174 arranged to admit fluid into interior region 123. Second end wall 160 closes an opening provided by second end 164 but has no outlet formed therein. Rather, sleeve 156 is formed to include an outlet 176 to discharge fluid from interior region 123.

Spring 80 biases valve 78 against first end wall 162 to a normally closed position. A first end 82 of spring 80 engages valve 78 and a second end 84 of spring 80 engages second end wall 160. Valve 78 moves to an opened position away from first end wall 158 in response to flow of fluid through inlet 174 to allow fluid to flow into interior region 123 in a first direction 185 and out of interior region 123 through outlet 176 in a second direction 187 generally perpendicular to first direction 185.

A fluid filter apparatus 210 shown in FIGS. 8–11 is arranged to filter contaminants from fluid, such as oil, received from a fluid source 211, such as a vehicle engine. Apparatus 210 includes a filter element 212 positioned in a filter chamber 214 formed in a filter housing 216 to filter the contaminants for return of filtered fluid to the fluid source.

Figure 9:
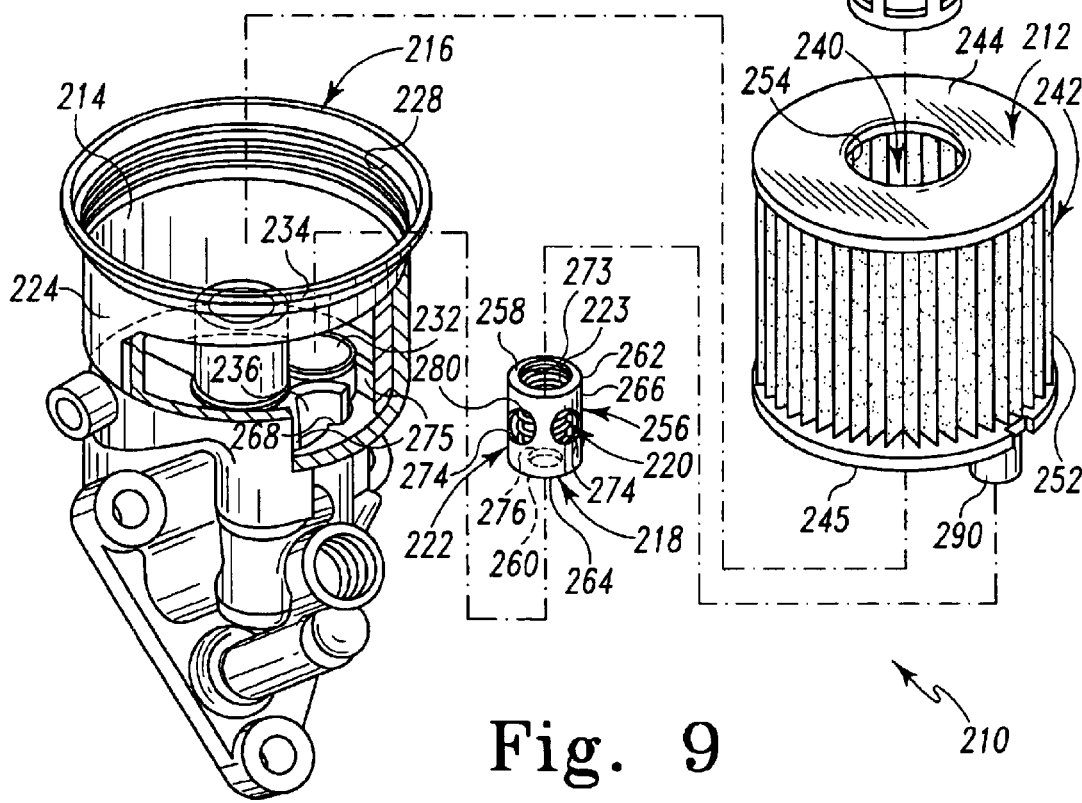
FIG. 9 is an exploded perspective view of the fluid filter apparatus of FIG. 8 showing an "empty" base of a filter housing, a cover configured to mate with the base to define a filter chamber therebetween, a filter element, a center tube sized to fit into a central interior region formed in the filter element, a spring between the cover and the center tube, and a quick-drain valve unit between the base and the filter element.
Figure 10:
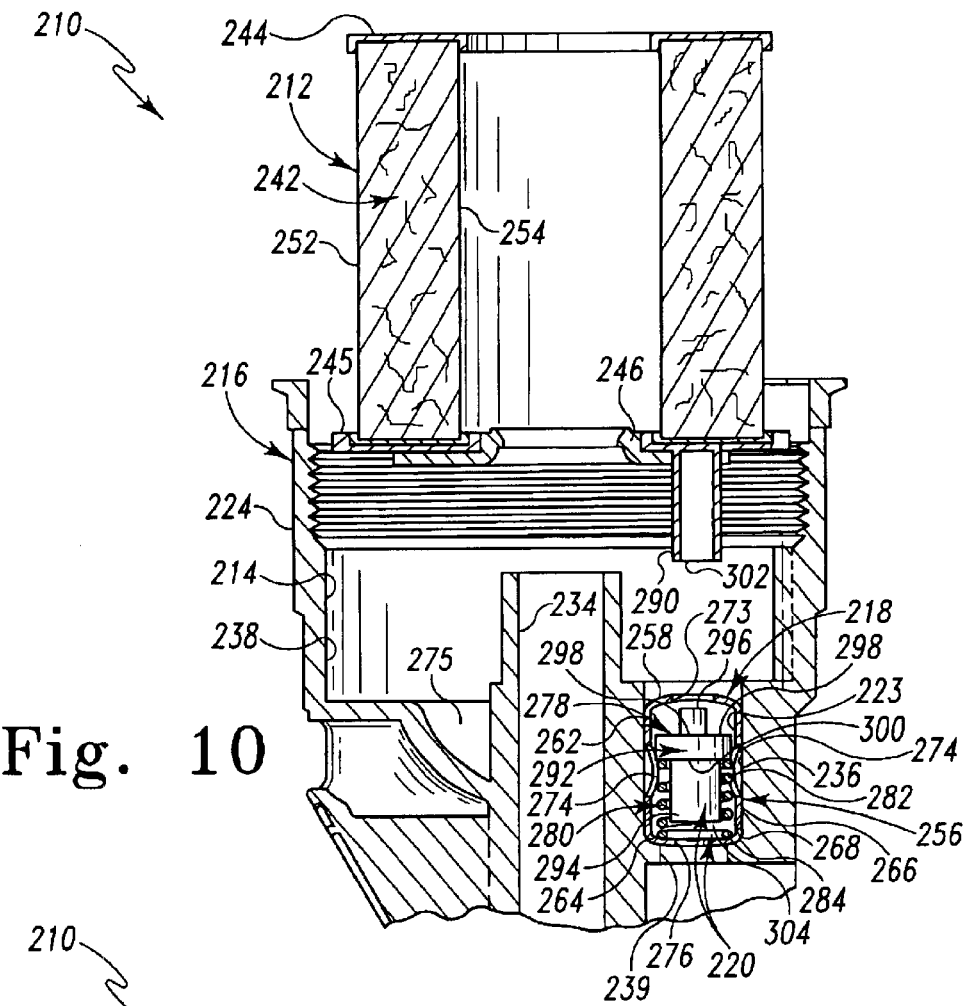
FIG. 10 is a sectional view taken along line 10—10 of FIG. 8 showing a quick-drain valve unit positioned in a quick-drain outlet passageway to control drainage of fluid from the filter chamber through a quick-drain outlet formed in the filter housing, the quick-drain valve unit including a container containing a spring biasing a flow-control valve to a normally opened position to allow drainage of fluid through the quick-drain outlet.
Figure 11:
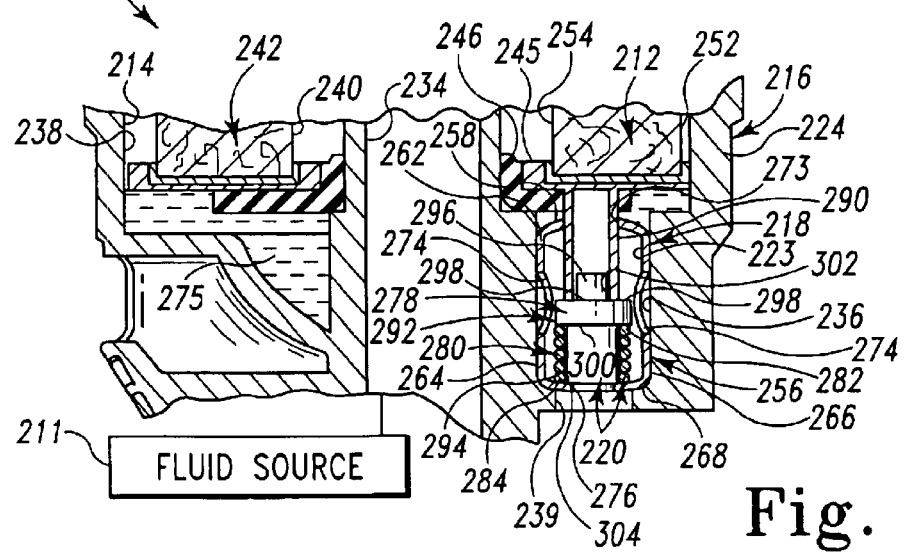
FIG. 11 is a sectional view similar to FIG. 10 showing a valve actuator appended to and extending downwardly from the filter element through an actuator-receiving aperture formed in the container to hold the valve in a closed position to block drainage of fluid from the filter chamber through the quick-drain outlet.

Apparatus 210 further includes a quick-drain valve unit 218 for controlling drainage of fluid from filter chamber 214 as shown in FIGS. 9–11. Valve unit 218 includes a normally opened fluid flow controller 220 (see FIGS. 10–11) and a container 222 (see FIGS. 9–11) formed to include an interior region 223 (see FIGS. 10–11) containing controller 220. Flow controller 220 allows drainage of fluid from filter chamber 214 through a quick-drain outlet 239 (see FIGS. 10–11) formed in housing 216 when filter element 212 is removed from filter chamber 214 and blocks flow of fluid from filter chamber 214 when filter element 212 is positioned in filter chamber 214. Container 222 provides retainer means for retaining controller 220 in a quick-drain outlet passageway 236 (see FIGS. 9–11) formed in housing 216, as discussed in more detail below.

Figure 8:
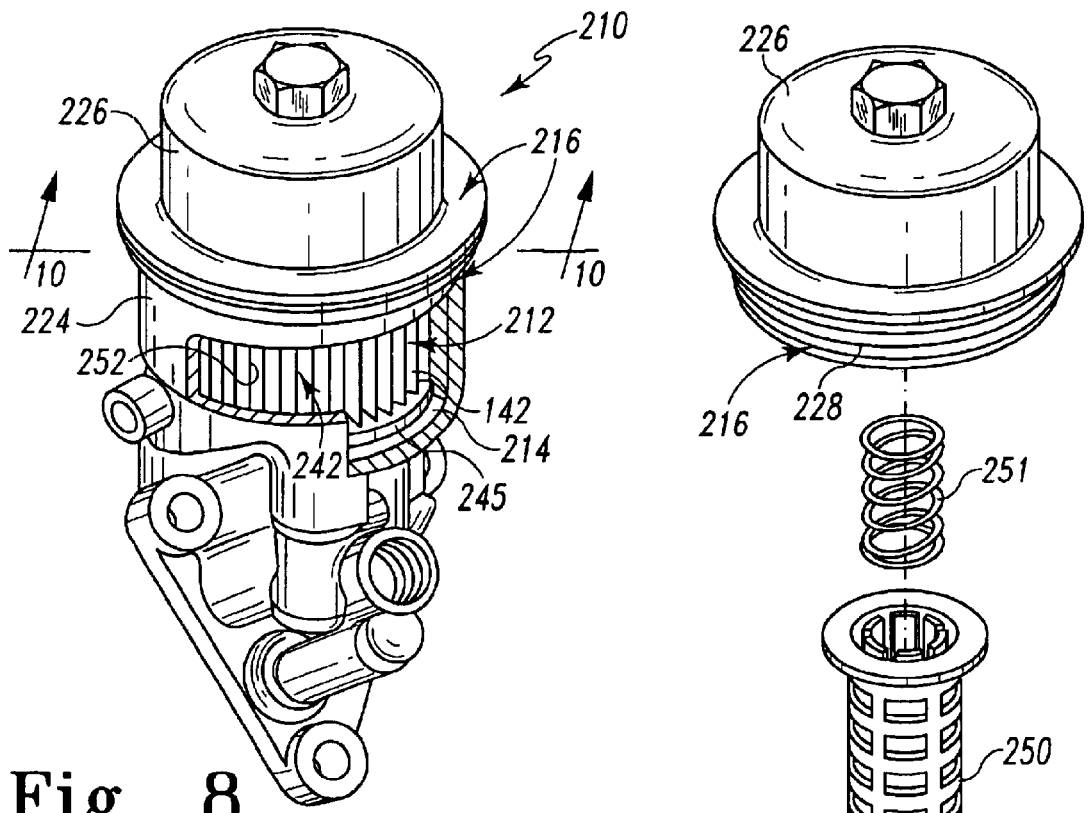
FIG. 8 is a perspective view of another fluid filter apparatus showing a portion of a filter housing broken away to expose a filter element mounted in a filter chamber formed in the filter housing.

Filter housing 216 includes a base 224 and a cover 226, as shown in FIGS. 8 and 9. Base 224 and cover 226 are coupled together at a threaded interface 228 as shown in FIG. 9 and cooperate to provide filter chamber 214.

Base 224 includes a mounting flange 230 (see FIGS. 8 and 9) for attachment to the fluid source by fasteners (not shown) and is formed to include an inlet passageway 232 (see FIG. 9), a centrally located filtered-fluid outlet passageway 234 (see FIGS. 9–11), and quick-drain outlet passageway 236. Inlet passageway 232 is arranged to conduct fluid from the fluid source to an unfiltered-fluid region 238 (see FIGS. 10 and 11) of filter chamber 214. Filtered-fluid outlet passageway 234 is arranged to conduct filtered-fluid from a filtered-fluid region 240 of filter chamber 214 to the fluid source 211 as shown in FIG. 11. Quick-drain outlet passageway 236 is arranged to conduct fluid from filter chamber 214 to quick-drain outlet 239 formed in base 224 for drainage of fluid from filter chamber 214 when filter element 212 is removed from filter chamber 214. Quick-drain fluid control unit 218 is positioned in passageway 236 to control fluid drainage therethrough.

Filter element 212 includes annular filter media 242 (see FIGS. 8–11) for filtering contaminants from fluid flowing radially inwardly therethrough from unfiltered-fluid region 238 to filtered-fluid region 240. Filter media 242 includes an exterior portion 252 (see FIGS. 8–11) and an interior portion 254 (see FIGS. 9–11). Exterior portion 252 is arranged to contact fluid as fluid flows from unfiltered-fluid region 238 into filter media 242. Interior portion 254 defines filtered-fluid region 240.

Element 212 further includes an annular first end cap 244 (see FIGS. 9–10) and an annular second end cap 245 (see FIGS. 8–11). Each end cap 244, 245 is coupled to one of the ends of filter media 242.

An annular seal 246 (see FIGS. 10 and 11) of apparatus 210 is attached to end cap 245 for sealingly engaging a centrally located post 248 (see FIGS. 9–11) of base 224 to block fluid from flowing from unfiltered-fluid region 238 between post 248 and end cap 245 to filtered-fluid region 240. Post 248 defines an inlet portion of filtered-fluid outlet passageway 234.

A center tube 250 of apparatus 210 is arranged to extend into filtered-fluid region 240 for radially positioning media 242 relative to housing 216 as shown in FIG. 9. A spring 251 of apparatus 210 is arranged to engage cover 226 and center tube 250 to bias filter element 212 downwardly.

Container 222 includes a cylindrical sleeve 256, a first end wall or container wall 258, and a second end wall or container wall 260, as shown in FIGS. 9–11. Sleeve 256 and walls 258, 260 cooperate to form interior region 223. Sleeve 256 is formed to include four circumferentially spaced inlets 274 at least two of which are in communication with channels 275 formed in base 224 to admit fluid from channels 275 into interior region 223.

As shown in FIGS. 9–11, sleeve 256 includes a first end 262 formed to include an opening and a second end 264 formed to include an opening. First end wall 258 is coupled to first end 262 to close the opening formed therein and is formed to include an actuator-receiving aperture 273. Second end wall 260 is coupled to second end 264 to close the opening formed therein and is formed to include an outlet 276 arranged to discharge fluid from interior region 223. Sleeve 256 includes a cylindrical exterior wall 266 that mates with a corresponding interior wall 268 of base 224 that provides quick-drain outlet passageway 236 to establish an interference fit between walls 266, 268 as shown in FIGS. 10 and 11.

Fluid flow controller 220 includes a quick-drain valve 278 and a spring 280 positioned in interior region 223, as shown in FIGS. 10 and 11. Spring 280 biases valve 278 toward an opened position to allow fluid to flow from inlets 274 through interior region 223 to outlet 276 when filter element 212 is removed from filter chamber 214. A valve actuator 290 appended to and extending downwardly from end cap 245 extends through actuator-receiving aperture 273 to move valve 278 to its closed position closing outlet 276 when filter element 212 is positioned in filter chamber 214.

Valve 278 includes a disk 292, a bottom stem 294, and a top stem 296, as shown in FIGS. 10 and 11. Disk 292 includes a top wall 298 facing toward first end wall 258 and a bottom wall 300 facing toward second end wall 260. Bottom stem 294 is appended to bottom wall 300 and extends downwardly therefrom in a first direction. Top stem 296 is appended to top wall 298 and extends upwardly therefrom in an opposite second direction. Bottom stem 294 is spaced apart from second end wall 260 when valve 278 is positioned in its opened position and engages second end wall 260 when valve 278 is positioned in its closed position.

Valve actuator 290 engages top wall 298 to move valve 278 to its closed position. Top stem 296 extends into a stem-receiving opening 302 formed in valve actuator 290, as shown in FIGS. 10 and 11, when actuator 290 engages top wall 298.

Spring 280 includes a first end 282 that engages bottom wall 300 and a second end 284 that engages second end wall 260, as shown in FIGS. 10 and 11. Spring 280 is a coil wound to define a central aperture 304 receiving bottom stem 294 therein. When filter element 212 is removed from filter chamber 214, spring 280 biases valve 278 upwardly to its opened position to allow drainage of fluid from inlets 274 through interior region 223 and convolutions of spring 280 to outlet 276 to drain through quick-drain outlet 239.

Valve unit 218 is assembled before it is inserted into quick-drain passageway 236. During assembly of valve unit 218, container 222 is configured initially so that sleeve 256 and first end wall 258 cooperate to form a cylindrical sleeve, that is, first end wall 258 extends longitudinally, rather than radially, from sleeve 256. In this orientation, first end wall 258 defines an opening having a diameter equal to the diameter of sleeve 256 to receive valve 278 and spring 280 therethrough into interior region 223. After valve 278 and spring 280 are inserted into interior region 223, second end wall 260 is crimped or otherwise deformed radially inwardly to trap valve 278 and spring 280 in interior region 223 and form actuator-receiving aperture 273.

Once assembled, valve unit 218 is inserted into quick-drain outlet passageway 236 and retained therein by an interference fit between container exterior wall 266 and interior wall 268 without damaging wall 268. If necessary, valve unit 218 can be removed from passageway 236 without damaging wall 268. Since wall 268 is not damaged during insertion, retention, and removal of valve unit 218, penalties associated with having to re-machine passageway 236 during replacement of fluid flow controller 220 are avoided.

Base 224 and filter element 212 cooperate to provide an anti-rotation device to block rotation of filter element 212 relative to base 224 to guide valve actuator 290 through actuator-receiving aperture 273 during installation of filter element 212 into filter chamber 214. The anti-rotation device includes a vertical rib 306 (see FIGS. 8–11) appended to and extending radially inwardly from an interior wall of base 224 and a rib-receiving notch 308 (see FIGS. 9–10) formed in a peripheral region of end cap 245. During installation of filter element 212 in filter chamber 214, rib 306 is positioned in notch 308 and slides therethrough so that valve actuator 290 is guided through actuator-receiving aperture 273 into interior region 223 and into engagement with valve 278 to move valve 278 to its closed position.

What is claimed is:

1. A fluid filter apparatus comprising
a filter housing formed to include a filter chamber, an inlet passageway arranged to conduct fluid into the filter chamber, and a first outlet passageway arranged to conduct fluid out of the filter chamber, the filter housing including an interior wall formed to include one of the inlet passageway and the first outlet passageway,
a filter element positioned to lie in the filter chamber, the filter element including an exterior portion located in the filter chamber to contact fluid admitted into the filter chamber through the inlet passageway, the filter element being formed to include an interior portion defining a filtered-fluid region located in the filter element to receive fluid in the filter element that has passed through the filter element from the exterior portion to the interior portion,
a first valve unit including a first fluid flow controller and first retainer means for retaining the first fluid flow controller in the one of the inlet passageway and the first outlet passageway, wherein the first retainer means is a container that mates against the interior wall and is formed to include a first interior region containing the first fluid flow controller, an inlet arranged to admit fluid into the first interior region, and an outlet arranged to discharge fluid from the first interior region, the first fluid flow controller includes a flow-control valve and a spring, the flow-control valve is arranged for movement in the first interior region relative to the container between a closed position blocking flow of fluid from the inlet through the first interior region to the outlet and an opened position allowing flow of fluid from the inlet through the first interior region to the outlet, and the spring engages the flow-control valve and the container and biases the flow-control valve toward the closed position.

2. The apparatus of claim 1, wherein the container includes a sleeve mating with the interior wall of the filter housing and having a first end and a second end, a first end wall closing an opening formed in the first end of the sleeve, and a second end wall closing an opening formed in the second end of the sleeve, the first end wall is formed to include the inlet, the second end wall is formed to include the outlet, the flow-control valve and the spring are positioned in the sleeve between the first end wall and the second end wall, and the flow-control valve engages the first end wall to close the inlet formed therein when the flow-control valve assumes the closed position.

3. The apparatus of claim 2, wherein the spring has a first end arranged to engage the flow-control valve and a second end arranged to engage the second end wall.

4. The apparatus of claim 3, wherein the spring is a coil wound to allow fluid to pass therethrough as the fluid flows from the inlet to the outlet through the first interior region of the container upon movement of the flow-control valve to the opened position in which the flow-control valve disengages the first end wall.

5. The apparatus of claim 1, wherein the container includes a sleeve mating with the interior wall of the filter housing and having a first end and a second end, a first end wall closing an opening formed in the first end of the sleeve, a second end wall closing an opening formed in the second end of the sleeve, the first end wall is formed to include the inlet, the sleeve is formed to include the outlet, the flow-control valve and the spring are positioned in the sleeve between the first end wall and the second end wall, and the flow-control valve engages the first end wall to close the inlet formed therein when the flow-control valve assumes the closed position.

6. The apparatus of claim 5, wherein the spring has a first end arranged to engage the flow-control valve and a second end arranged to engage the second end wall.

7. The apparatus of claim 1, wherein the container includes an exterior wall sized to mate with the interior wall of the filter housing to establish an interference fit therebetween to retain the container in a predetermined position in the filter housing.

8. The apparatus of claim 7, wherein the container includes a sleeve having a first end and a second end, a first end wall closing an opening formed in the first end of the sleeve and providing the inlet, a second end wall closing an opening formed in the second end of the sleeve and providing the outlet, and wherein the exterior wall of the container is included in the sleeve.

9. The apparatus of claim 8, wherein each of the interior and exterior walls has a cylindrical shape.

10. The apparatus of claim 8, wherein the flow-control valve is arranged in the interior region of the container to engage the first end wall to close the inlet formed therein upon movement of the flow-control valve to assume the normally closed position and the spring is arranged in the interior region of the container to engage the second end wall.

11. The apparatus of claim 1, further comprising a second valve unit including a second fluid flaw controller and second retainer means for retaining the second fluid flow controller in the other of the inlet passageway and the first outlet passageway, wherein the filter housing includes a second interior wall formed to include the other of the inlet passageway and the first outlet passageway, the second retainer means is a second container that mates with the second interior wall and is formed to include a second interior region containing the second fluid flow controller, a second inlet arranged to admit fluid into the second interior region, and a second outlet arranged to discharge fluid from the second interior region, the second fluid flow controller includes a second flow-control valve and a second spring, the second flow-control valve is arranged for movement in the second interior region relative to the second container between a closed position blocking flow of fluid from the second inlet through the second interior region to the second outlet and an opened position allowing flow of fluid from the second inlet through the second interior region to the second outlet, and the second spring engages the second container and the second flow-control valve and biases the second flow-control valve toward the closed position of the second flow-control valve.

12. The fluid filter apparatus of claim 1, wherein the one of the inlet passageway and the first outlet passageway includes an upstream channel and a downstream channel extending from the upstream channel at an angle to the upstream channel to provide a turn in the one of the inlet passageway and the first outlet passageway, the valve unit is located in the turn, and the container includes a sleeve formed to include the outlet and a first container wall extending from the sleeve at an angle to the sleeve and formed to include the inlet.

13. The apparatus of claim 1, wherein the container is positioned in the inlet passageway.

14. The apparatus of claim 13, wherein the filter housing includes a base and a cover that is removably coupled to the base and cooperates with the base to define the filter chamber, and the base is formed to include the inlet passageway in which the container is positioned.

15. The apparatus of claim 1, wherein the container is positioned in the first outlet passageway.

16. The apparatus of claim 15, wherein the filter housing includes a base and a cover that is removably coupled to the base and cooperates with the base to define the filter chamber, and the base is formed to include the first outlet passageway in which the container is positioned and which is positioned for fluid communication with the filtered-fluid region to discharge filtered fluid from the filter chamber.

17. A fluid filter comprising:
a filter housing including a base and a cover removably coupled to the base, the base and cover cooperating to include a filter chamber, and the base including a wall formed to include an inlet passageway arranged to conduct fluid into the filter chamber, a filter element arranged in the filter chamber to filter fluid flowing through the filter chamber, and a valve unit positioned in the inlet passageway and including a flow-control valve, a spring biasing the valve, and a container formed to include an interior region containing the flow-control valve and the spring, an inlet arranged to admit fluid into the interior region, and an outlet arranged to discharge fluid from the interior region, the container mating with the wall in the inlet passageway to hold the flow-control valve and the spring in the inlet passageway.

18. The fluid filter apparatus of claim 17, wherein the container includes a sleeve engaging the wall to establish an interference fit between the sleeve and the wall, a first container wall extending radially inwardly from the sleeve and formed to include the inlet, and a second container wall extending radially inwardly from the sleeve and formed to include the outlet, the sleeve, the first container wall, and the second container wall cooperating to provide the interior region, the spring engages the second container wall and the flow-control valve to urge the flow-control valve into engagement with the first container wall so that the flaw-control valve normally assumes a closed position closing the inlet to block flow of fluid therethrough.

19. The fluid filter apparatus of claim 17, wherein the flow-control valve is arranged for movement in the interior region relative to the container between a closed position blocking flow of fluid from the inlet passageway through the inlet, the interior region, and the outlet to the filter chamber and an opened position allowing flow of fluid from the inlet passageway through the inlet, the interior region, and the outlet to the filter chamber, and the spring biases the flow-control valve to the closed position.

20. A fluid filter apparatus comprising
a filter housing including a base and a cover removably coupled to the base, the base and the cover cooperating to provide a filter chamber, the base including a wall formed to include an outlet passageway arranged to conduct fluid out of the filter chamber, a filter element arranged in the filter chamber to filter fluid flowing through the filter chamber, and a valve unit positioned in the outlet passageway and including a flow-control valve, a spring, and a container formed to include an interior region containing the flow-control valve and the spring, an inlet arranged to admit fluid into the interior region, and an outlet arranged to discharge fluid from the interior region, the container mating with the wall in the outlet passageway to hold the flow-control valve and the spring in the outlet passageway, the flow-control valve being arranged for movement in the interior region relative to the container between a closed position blocking flow of fluid from the filter chamber through the inlet, the interior region, and the outlet to the outlet passageway and an opened position allowing flow of fluid from the filter chamber through the inlet, the interior region, and the outlet to the outlet passageway, the spring engaging the flow-control valve and the container and biasing the flow-control valve toward the closed position.

* * * * *

UNITED STATES PATENT AND TRADEMARK OFFICE
CERTIFICATE OF CORRECTION

| | |
|---|---|
| PATENT NO. | : 6,936,161 B2 |
| DATED | : August 30, 2005 |
| INVENTOR(S) | : Allen B. Wright, Timothy Alan Byrd and L. Steven Cline |

It is certified that error appears in the above-identified patent and that said Letters Patent is hereby corrected as shown below:

Column 10,
Line 25, "flaw" is changed to -- flow --.

Signed and Sealed this

First Day of November, 2005

JON W. DUDAS
*Director of the United States Patent and Trademark Office*